US012693374B2

(12) United States Patent
Welle et al.

(10) Patent No.: US 12,693,374 B2
(45) Date of Patent: Jul. 28, 2026

(54) PROTECTION DEVICE FOR SEALING A SENSOR DEVICE

(71) Applicant: VEGA GRIESHABER KG, Wolfach (DE)

(72) Inventors: Roland Welle, Hausach (DE); Levin Dieterle, Oberwolfach (DE)

(73) Assignee: VEGA GRIESHABER KG, Wolfach (DE)

( * ) Notice: Subject to any disclaimer, the term of this patent is extended or adjusted under 35 U.S.C. 154(b) by 850 days.

(21) Appl. No.: 17/760,389

(22) PCT Filed: Feb. 10, 2021

(86) PCT No.: PCT/EP2021/053135

§ 371 (c)(1),
(2) Date: Aug. 9, 2022

(87) PCT Pub. No.: WO2021/165107

PCT Pub. Date: Aug. 26, 2021

(65) Prior Publication Data

US 2023/0032016 A1      Feb. 2, 2023

(30) Foreign Application Priority Data

Feb. 17, 2020    (DE) ..................... 10 2020 201 954.1

(51) Int. Cl.
G01S 7/02          (2006.01)
G01F 23/284     (2006.01)
G01S 13/88       (2006.01)

(52) U.S. Cl.
CPC ............ G01S 7/027 (2021.05); G01F 23/284 (2013.01); G01S 13/88 (2013.01)

(58) Field of Classification Search
CPC ......... G01S 7/027; G01S 13/88; G01F 23/284
See application file for complete search history.

(56) References Cited

U.S. PATENT DOCUMENTS

| 5,801,330 A | 9/1998 | Gademann et al. |
| 6,325,391 B1 | 12/2001 | Smith et al. |
| | (Continued) | |

FOREIGN PATENT DOCUMENTS

| CN | 1731107 A | 2/2006 |
| CN | 110793595 A | 2/2020 |
| | (Continued) | |

OTHER PUBLICATIONS

International Search Report issued May 14, 2021, in PCT/EP2021/053135, filed Feb. 10, 2021, 2 pages.

(Continued)

*Primary Examiner* — Andrew D Perreault
(74) *Attorney, Agent, or Firm* — Oblon, McClelland, Maier & Neustadt, L.L.P.

(57) ABSTRACT

A protective device for sealing a sensor device of an intermediate area outside a sensor device attached to a container, a measuring device, a container with a fastening device for fastening a protective device and the use of a protective device for sealing a sensor device of an intermediate area outside a sensor device attached to a container, in particular a level radar sensor arrangement. The protective device comprises a housing and a circumferential seal arranged on a side of the housing intended for abutment against the container or on an outer side of the housing.

4 Claims, 3 Drawing Sheets

(56) References Cited

U.S. PATENT DOCUMENTS

| | | | | |
|---|---|---|---|---|
| 6,658,932 | B2 * | 12/2003 | Munley | G01F 23/284 |
| | | | | 333/252 |
| 7,134,315 | B1 * | 11/2006 | Stigler | H01Q 1/225 |
| | | | | 73/290 R |
| 10,725,160 | B2 * | 7/2020 | Larsson | F16B 47/006 |
| 2018/0292519 | A1 | 10/2018 | Larsson | |
| 2019/0186977 | A1 | 6/2019 | Mabee et al. | |
| 2020/0166386 | A1 * | 5/2020 | Hoffmann | G01D 11/30 |
| 2021/0318159 | A1 * | 10/2021 | Dieterle | G01F 23/284 |

FOREIGN PATENT DOCUMENTS

| | | | |
|---|---|---|---|
| DE | 41 22 897 | C1 | 6/1992 |
| DE | 196 04 124 | A1 | 8/1996 |
| DE | 198 16 217 | A1 | 10/1999 |
| EP | 3 385 682 | A1 | 10/2018 |
| WO | WO 00/29819 | A1 | 5/2000 |

OTHER PUBLICATIONS

German Office Action issued Mar. 15, 2021 in German Patent Application No. 10 2020 201 954.1, 4 pages.
International Preliminary Report on Patentability and Written Opinion issued on Sep. 1, 2022 (submitting English translation only), 6 pages.
Office Action dated Feb. 28, 2026, issued in counterpart CN Application No. 202180014674.5, w/English translation, citing documents No. 1 and 2. (26 pages).

* cited by examiner

PROTECTION DEVICE FOR SEALING A SENSOR DEVICE

REFERENCE TO RELATED APPLICATIONS

The present application claims priority to German Patent Application No. 10 2020 201 954.1, filed Feb. 17, 2020, which is incorporated herein by reference in its entirety.

FIELD OF INVENTION

The invention relates to a measuring technique. In particular, the invention relates to a protective device for sealing a sensor device on a container, a measuring device, a container with a fastening device for fastening a protective device and the use of a protective device for sealing a sensor arrangement, in particular a level radar sensor arrangement.

BACKGROUND OF THE INVENTION

A measuring device or field device, for example a level radar sensor, is often used in automation technology to monitor a property of the filling medium, for example the level, pressure or temperature, in the container on which the measuring device is mounted. There is a great need for further development of the measuring device to increase the durability and reliability of the measuring device, as well as to improve the measurement results despite influences from the environment, especially when the measuring device is used outdoors with relatively large fluctuation in environmental conditions.

SUMMARY OF THE INVENTION

It is an object of the invention to provide reliable measurement results even under highly fluctuating environmental conditions.

The object is solved by the features of the independent patent claims. Further embodiments of the invention result from the subclaims and the following description.

One aspect of the present disclosure relates to a protective device for sealing an intermediate region external to a sensor device attached to a container, comprising a housing and a circumferential seal. The circumferential seal is disposed on a side of the housing intended to abut the container or on an exterior side of the housing.

In other words, the circumferential seal can be designed below the housing or circumferentially around the housing.

The sensor device is, for example, a level radar sensor arrangement which has a radar sensor with an antenna for transmitting and/or receiving a measurement signal in a main beam direction. To carry out the measurement, the sensor arrangement is arranged on the upper outer wall of the container.

The container can be made of a plastic material so that the measurement by means of the radar sensor can be made through the container wall.

According to an embodiment, the protective device further comprises a fastening device adapted to fasten the protective device to the container.

The fastening device may be mounted on the container.

According to an embodiment, the circumferential seal is adapted to seal the intermediate region created by the circumferential seal, the housing, and the container or by the circumferential seal, the housing, the container, and the fastening device.

The antenna of the sensor arrangement is set up to emit a measurement signal along a main beam direction in the direction of the underside or the side of the housing intended for contact with the container through the container wall and/or to receive the reflected measurement signal from the surface of the filling material in the container. When the sensing device is attached to the container, an intermediate area or enclosed space is created by the surrounding seal, the housing of the sensing device, the outer wall of the container and, if applicable, the mounting device. In contrast, "environment" refers to a further space outside the container and the enclosed intermediate area. Thus, the intermediate area is at least separated or even isolated from the surroundings by means of the circumferential seal.

According to an embodiment, the housing comprises a connecting channel and a membrane and is adapted to enclose the sensor device.

The wall of the connecting channel may be a part of the housing of the sensor device. For example, the membrane is provided at an upper end of the connection channel opposite the side of the housing intended for contact with the container.

According to an embodiment, the membrane is a waterproof and gas permeable pressure equalization membrane.

According to an embodiment, the housing is arranged to equalize the pressure in the intermediate region through the connecting channel and the diaphragm.

The connecting channel may be in the form of a feedthrough in the housing and have an upper end and a lower end. Placing the membrane at the upper end of the connecting channel can advantageously allow transport of only gaseous molecules during pressure equalization between the environment and the intermediate region. This prevents, for example, the accumulation of standing water on the outside of the membrane and thus improves the protective effect of the protective device.

According to an embodiment, the protective device is arranged to protect the sensor device from condensate in the intermediate area by means of the circumferential seal and the connecting channel and membrane of the housing.

With the circumferential seal, the penetration of liquid media, e.g. rainwater or moist air/water vapor, from the environment into the enclosed intermediate area or into the separated volume can be prevented to the greatest possible extent. However, there is still the possibility of moisture or other media entering the intermediate area or condensate being formed from the volume of air or gas existing in the intermediate area. The condensate, for example in the form of condensation, can still accumulate in the intermediate area or on the outer wall of the container in the area of the main beam direction. Measurement with the sensor arrangement can thus be impaired, made considerably more difficult or even impossible, since the measurement signal is largely reflected or adsorbed by the condensate or cannot be continued in the main beam direction at all.

To prevent or at least reduce the formation of the condensate in the intermediate area, the connection channel can be provided inside the housing. For example, the lower end of the connecting channel may be located in the area of the intermediate region directly adjacent to the lower end of the antenna. In the enclosed intermediate region, the connecting channel is arranged to connect the volume, which is separated from the environment by the circumferential seal, to the environment via the waterproof, gas-permeable pressure equalization membrane and to equalize the pressure within the intermediate region with the environment. For example, since the membrane is located at the upper end of the connecting channel of the housing, the pressure equalization is performed by the transport or diffusion of the air or gas molecules from the enclosed intermediate region to the environment when there is a higher pressure in the enclosed intermediate region compared to the pressure in the environment. The diffusion of the gaseous molecules from the intermediate region through the pressure equalization membrane can cause the amount of condensate formed, which is formed in a small amount due to the temperature or pressure variation, for example, to decrease.

Advantageously, the protective device with the arrangement of the circumferential seal and the housing with the connecting channel and the membrane can provide double protection for the sensor device. By the double protection of the sensor arrangement on the one hand, against the penetration of the majority of liquid and gaseous media from the environment into the enclosed intermediate area by means of the circumferential seal and on the other hand, against the formation of the condensate within the intermediate area by means of the connecting channel and the membrane of the housing, the durability as well as the reliability of the sensor arrangement can be increased. As a result, the costs for maintenance and repair of the sensor arrangement or a measuring device with the sensor arrangement can be significantly reduced.

According to an embodiment, the circumferential seal is designed to be deformable.

The circumferential seal may be a flexible or compressible seal or may be made of an elastomer or resilient plastic. It is possible that the container or housing may have a non-uniformly curved surface after a long period of use, which may make it difficult to secure the housing to the container. For example, the surface of the container may also be further deformed by the filling or emptying process, by the movement of the contents or filling medium in the container during transportation, or by the influence of temperature changes in the environment. The flexibility or deformability of the circumferential seal can allow better adaptation or fitting of the seal to the surface of the container, the fastening device or the housing during fastening and optimize the seal.

According to an embodiment, the circumferential seal has a hollow chamber profile or the circumferential seal is made of a closed porous material.

According to an embodiment, the circumferential seal comprises a widening adapted to press in and secure the circumferential seal to the housing.

The housing may further include a recess on the side of the housing intended for contact with the container, in which the circumferential seal may be disposed. The recess may be formed in a shape corresponding to the distribution of the circumferential seal. This may result in a very robust and stable attachment of the housing to the container and a very reliable and durable seal, since, for example, lateral forces on the housing can be absorbed by the seal. Furthermore, the housing can be integrated or integrally formed with the circumferential seal by means of the recess in the housing and the widening of the seal.

Alternatively, the circumferential seal may be attached to or integrated into the fastening device.

According to an embodiment, the fastening device is designed as a snap lock, bayonet lock or screw lock.

Alternatively, the housing may be attached to the container or mounting device by screwing or bolting it into place.

According to an embodiment, the fastening device is adapted to generate a compressive force on the circumferential seal when the protective device is fastened to the container to press the circumferential seal against the container or against the fastening device.

The fastening device may be configured such that when the housing is fastened to the container, the contact pressure creates a deformation or compression of the flexible circumferential seal, thereby exerting a compressive force on the seal. The contact pressure can deform the seal to such an extent that the contact area between the seal and the underside of the housing and the contact area between the seal and the container can be increased, thus ensuring that the sensor device is sealed.

In the case where the circumferential seal is attached to or integral with the fastening device, the fastening may be accomplished by the circumferential seal being deformed by the compressive force and pressed against the housing.

Alternatively, or in addition, the attachment device may include a tensioning strap to compress the circumferential seal when the housing is attached to the container such that only a minimal volume or no volume of unwanted foreign matter can enter the enclosed space.

Another aspect of the present disclosure relates to a measuring device comprising a sensor arrangement and a protective device for sealing an intermediate region outside a sensor device attached to a container.

The intermediate area may include at least a partial area in the main beam direction of the antenna that can be protected from environmental influences during the measurement of the measuring device.

Another aspect of the present disclosure relates to a container having an attachment means for attaching a protective device.

Another aspect of the present disclosure relates to the use of a protective device for sealing an intermediate region outside a sensor arrangement attached to a container, in particular a level radar sensor arrangement.

Further embodiments of the invention are described below with reference to the figures. Where identical reference signs are used in the following description of figures, these designate identical or similar elements. The illustrations in the figures are schematic and not to scale.

SHORT DESCRIPTION OF THE FIGURES

DETAILED DESCRIPTION OF EXAMPLES OF EXECUTION

Figure 1A:
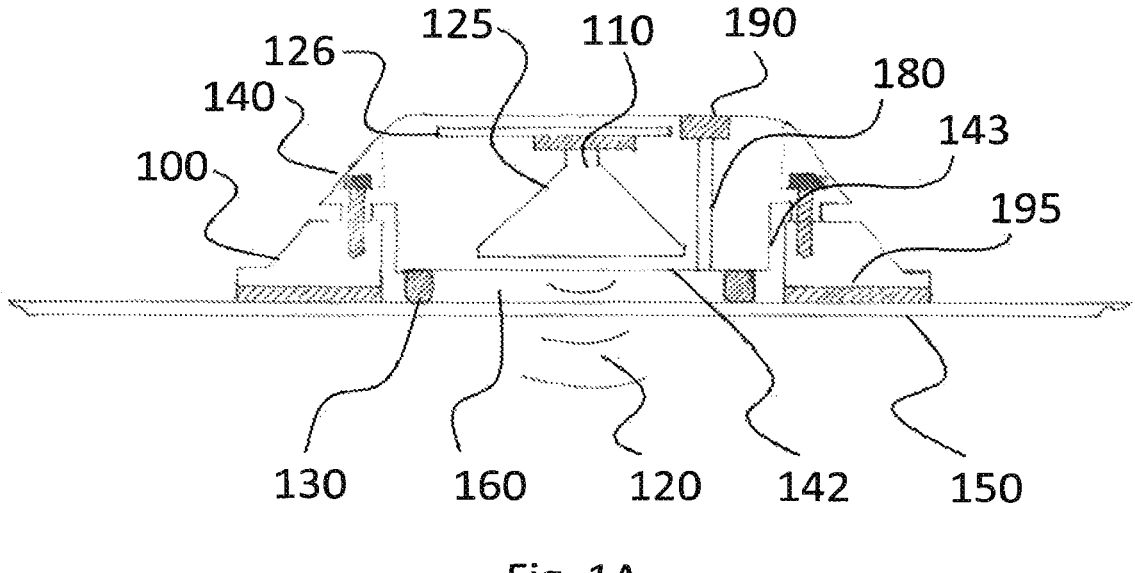
FIG. 1A shows a schematic representation of a protective device for sealing a sensor device according to an embodiment.

FIG. 1A shows a schematic illustration of a protective device for sealing an intermediate area 160 outside a sensor device 110 attached to a container 150. The protective device comprises a housing 140 and a circumferential seal 130. Further, the protective device comprises a fastening device 100 configured to fasten the protective device to the container 150.

The housing 140 has a lower side, namely a side 142 provided for abutment against the container 150, on which the seal 130 circulating on the outer side of the housing 140 is arranged when the protective device is fastened to the container 150.

Figure 1B:
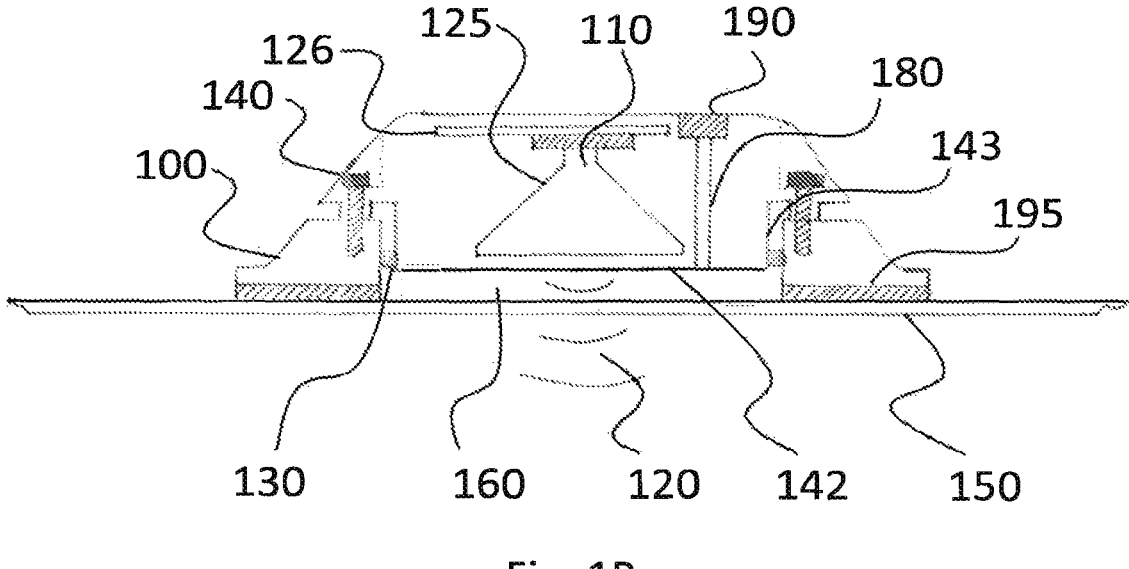
FIG. 1B shows a schematic representation of a protective device for sealing a sensor device according to a further embodiment.

Alternatively, FIG. 1B shows a protective device having a housing 140 and a perimeter seal 130 disposed on an exterior 143 of the housing 140.

FIG. 1A and FIG. 1B show that the sensor arrangement 110 is enclosed by the housing 140. The sensor arrangement 110 comprises an antenna 125, which is arranged to transmit and receive a measurement signal in the direction of the container 150 or of a filling material in the container 150, and an electronics unit 126, which is arranged to evaluate the measurement signal. The measurement signal, for example in the form of an electromagnetic wave, propagates along a main beam direction 120 in the direction of the container 150.

In FIG. 1A, an intermediate region or enclosed space 160 is created or formed by the circumferential seal 130, the housing 140, and the container 150 when the housing 140 is attached to the container 150. Compared to FIG. 1A, an intermediate region 160 is formed by the circumferential seal 130, the housing 140, the container 150, and the attachment device 100 when the housing 140 is attached to the container 150. The intermediate region 160 is separated from the surrounding environment, which is the entire space outside the container and the enclosed intermediate region 160.

Furthermore, the housing 140 comprises a connecting channel 180 and a membrane 190, in particular a waterproof and gas-permeable pressure equalizing membrane, and is adapted to equalize the pressure in the intermediate region 160 with the environment through the connecting channel 180 and the membrane 190.

The connecting channel 180 is in the form of a feed-through in the housing and may have an upper end and a lower end. The membrane 190 is provided at the upper end of the connecting channel 180. Further, the connecting channel 180 is configured to connect the volume in the intermediate region 160 to the environment via the waterproof, gas-permeable pressure equalization membrane 190. Pressure equalization occurs, for example when a higher pressure is present in the intermediate region, by transporting the gaseous molecules from the intermediate region 160 to the environment. Thus, formation of condensate or water accumulation in the intermediate region 160 can be prevented.

Further, the protective device is adapted to protect the sensor device 110 from condensate in the intermediate region 160 by means of the circumferential seal 130, the connecting channel 180, and the membrane 190.

By means of the circumferential seal 130, the penetration of a large portion of moisture, such as rainwater or other liquid media, as well as moist air, from the environment into the enclosed intermediate region 160 can be prevented. However, the penetration or permeation of moist air or other gases into the intermediate region 160 cannot be completely prevented by the circumferential seal 130. In addition, a condensate may also be formed from the volume of air existing in the intermediate region in the form of the condensed water due to the change in the environmental conditions such as the temperature variation, and may be accumulated on the outer wall of the container 150 in the region of the intermediate region 160. This may interfere with or significantly complicate the measurement of the sensor arrangement 110, as the measurement signal may be reflected, absorbed, or not continued at all in the main beam direction 120 by the condensate.

The protective device is adapted to prevent, by means of the connecting channel 180 and the membrane 190 of the housing 140, the formation of the condensate in the intermediate region 160 by allowing the intermediate region 160 to be reconnected to the environment via the connecting channel 180 and the waterproof, gas-permeable pressure equalizing membrane 190, and equalizing the pressure within the intermediate region 160 with the environment. The diffusion of the gaseous molecules from the intermediate region 160 through the pressure equalization membrane 190 may cause the amount of the condensate formed, which is formed in a small amount due to the temperature or pressure variation, for example, to decrease. Thus, the formation of the condensate in the main beam direction 120 of the measurement signal can be prevented.

Advantageously, the protective device with the arrangement of the circumferential seal and the housing with the connecting channel and the membrane can enable a double protection for the sensor device. Due to the double protection, on the one hand against the penetration of the majority of water or other liquid media as well as humid air from the environment into the enclosed space 160 by means of the circumferential seal 130 and on the other hand against the formation of the condensate within the enclosed space by means of the connecting channel 180 and the membrane 190 of the housing 140, the durability as well as the reliability of the sensor arrangement 180 can be improved in an increased manner. As a result, the cost of maintenance and repair of the sensor arrangement can be saved.

The mounting device 100 of the protective device may be fixedly mounted to the container 150.

Alternatively, the protective device 110 may be secured, for example, by means of a double-sided closed-cell acrylic adhesive tape 195 directed to seal the enclosed intermediate region 160.

For example, the protective device in FIG. 1A and FIG. 1B is fastened by screwing or bolting the housing 140 to the container 150 via the fastening device 100 using screws. The fastening device 100 may also be a snap-on fastener or bayonet fastener.

Figure 2A:
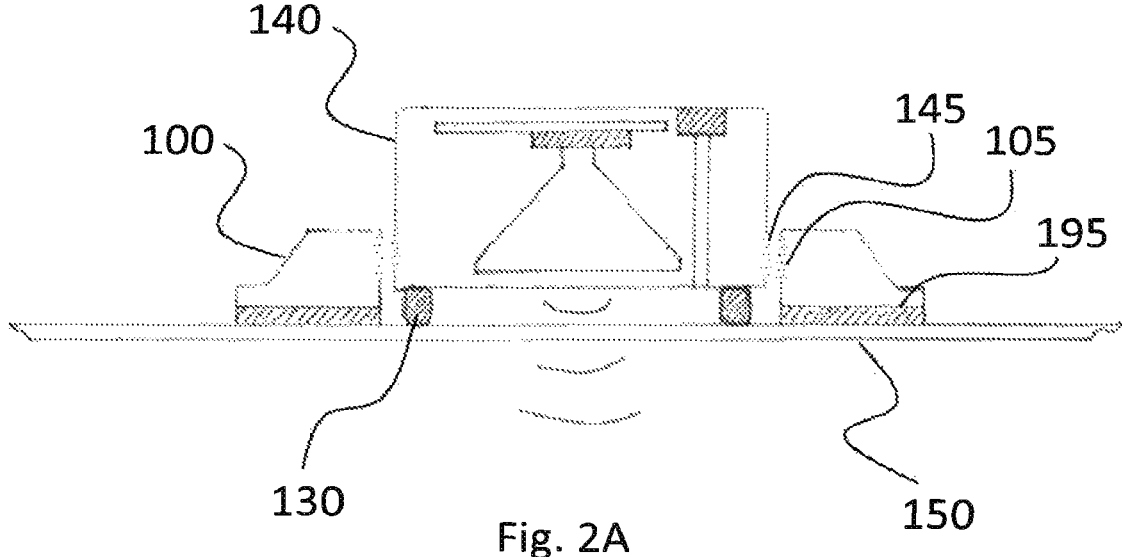
FIG. 2A shows a schematic representation of a protective device for sealing a sensor device according to a further embodiment.

Alternatively, the fastening device 100 can be designed as a screw cap, as shown in FIG. 2A. For this purpose, a thread 145 is provided on the housing 140 and a corresponding counter-thread 105 on the fastening device 100.

Figure 2B:
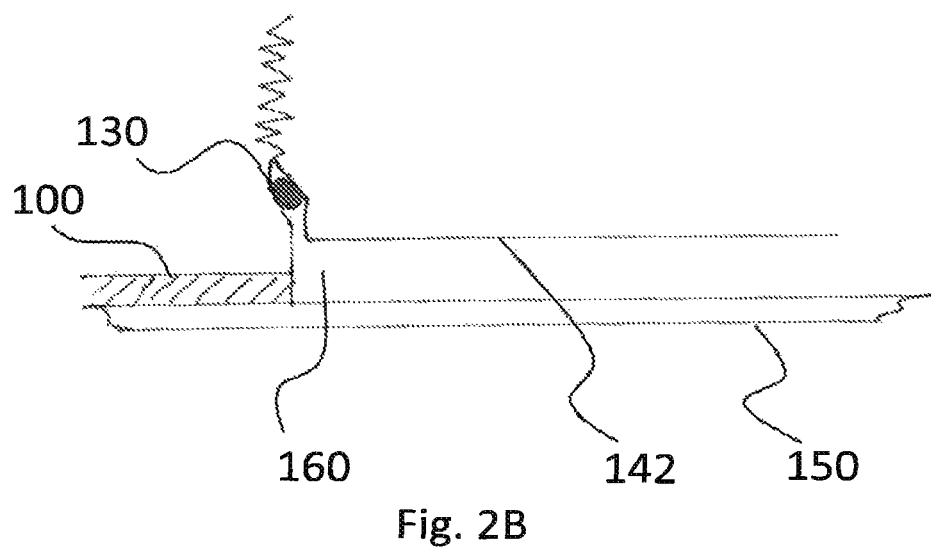
FIG. 2B shows a schematic diagram of an arrangement of a seal according to an embodiment.

Alternatively, as shown in FIG. 2B, the seal 130 may be between the housing 140 and the fastening device 100. For this purpose, the attachment of the fastening device 100 and/or the bonding by means of the adhesive tape 195 may have a sealing property.

Further, when the protective device 110 is attached to the container 150, the attachment device 100 is configured to generate a compressive force on the circumferential seal 130 to press the circumferential seal against the container 150 or against the attachment device 100.

The fastening device 100 may be configured to create a deformation or compression of the flexible circumferential seal 130 when the housing 140 is attached to the container 150, thereby applying a compressive force to the circumferential seal 130. The compression may deform the circumferential seal 130 sufficiently to increase the contact area between the seal 130 and the housing 140, and to increase the contact area between the seal 130 and the container 150 or the attachment device 100, thereby ensuring sealing of the enclosed intermediate region 160.

Alternatively, or in addition, the attachment device 100 may include a tensioning strap to compress the perimeter seal 130 when the housing 140 is attached to the container 150 such that the intermediate area 160 is minimized.

To ensure that the circumferential seal 130 is always in contact due to the applied compressive force, the circumferential seal 130 is designed to be flexible, deformable or compressible and is arranged on the outside between the housing 140 and the container 150 or the fastening device 100. The circumferential seal 130 may be made of an elastomer or an elastic plastic. Since it is possible for the container 150, the housing 140 or the fastening device 100 to have a non-uniformly curved surface after long use and/or for the surface of the container 150 to deform as a result of the filling or emptying process, or as a result of the movement of the filling material during transport or as a result of the influence of temperature changes, the use of the flexibly deformable circumferential seal 130 can enable better adaptation to the surfaces contacting the seal and thus optimize the seal.

Figure 3A:
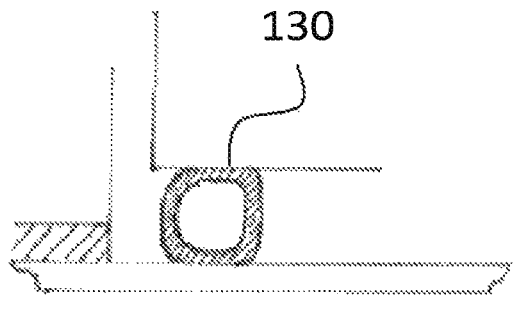
FIG. 3A shows a schematic representation of a circumferential seal of the protective device according to an embodiment.
Figure 3B:
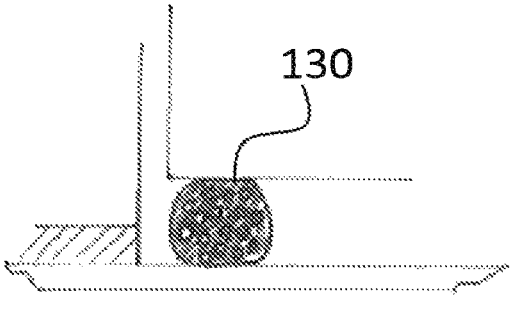
FIG. 3B shows a schematic representation of a circumferential seal of the protective device according to a further embodiment.

The circumferential seal 130 can be formed such that the seal either has a hollow chamber profile, as shown in FIG. 3A, or is made of a closed porous material, as shown in FIG. 3B.

Figure 4:
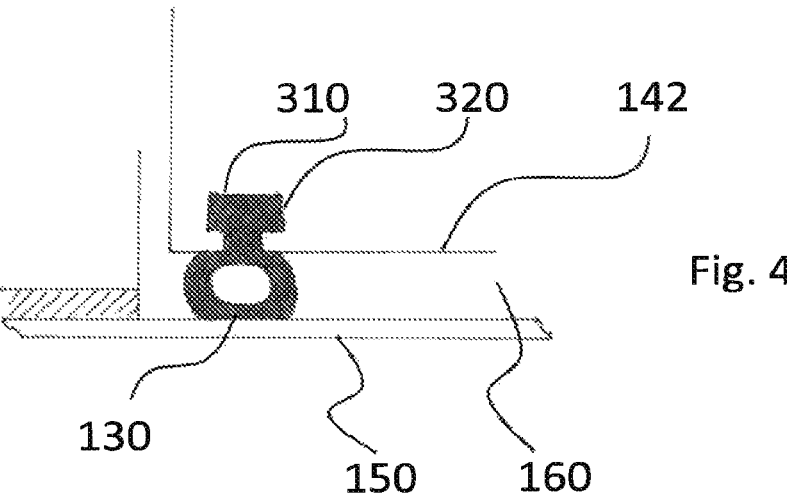
FIG. 4 shows a schematic representation of a circumferential seal of the protective device according to a further embodiment.

Alternatively, FIG. 4 shows that the circumferential seal 130 includes a widening 310 configured to press in and secure the circumferential seal 130 to the housing 140. Accordingly, the housing 140 includes a recess 320. To this end, the recess 320 may be formed in a shape corresponding to the widening 310 of the circumferential seal 130. The housing 140 may be integrally formed with the circumferential seal 130 by means of the recess 320 and the widening 310.

Supplementally, it should be noted that "comprising" or "having" does not exclude other elements, and "a" or "an" does not exclude a plurality. It should further be noted that features described with reference to any of the above embodiments may also be used in combination with other features of other embodiments described above. Reference signs in the claims are not to be regarded as a limitation.

The invention claimed is:

1. A protective device for receiving a sensor device, the protective device being attached to a container and comprising:
 a housing comprising an outside thread;
 a mounting device fixedly mounted to the container and comprising an inside thread into which the outside thread of the housing is screwed to fasten the protective device to the mounting device; and
 a perimeter seal disposed on an outer conical surface area of the housing adjacent to the outside thread and between the housing and the mounting device and pressed against a corresponding conical surface area of the mounting device to provide sealing of a cavity formed by the housing, the container, the seal and the mounting device.

2. The protective device according to claim 1, wherein the perimeter seal is configured to be deformable.

3. The protective device according to claim 1, wherein the mounting device is configured to generate a compressive force on the perimeter seal when the protective device is fastened to the container to press the perimeter seal against the container or against the mounting device.

4. The protective device according to claim 1, wherein the perimeter seal is configured to be deformable.

\* \* \* \* \*